United States Patent

Pickornik et al.

(10) Patent No.: US 6,246,317 B1
(45) Date of Patent: Jun. 12, 2001

(54) TARGET PRESSURE LEARN STRATEGY FOR VEHICULAR TIRE PRESSURE SYSTEMS

(76) Inventors: William Pickornik, 7165 Lakeridge Pl.; Gary R. Schultz, 9920 Springwood Dr., both of Kalamazoo, MI (US) 49009; G. Clark Fortune, 34746 Bunker Hill Dr., Farmington Hills, MI (US) 48331; Thomas J. Waraksa, 612 Hawksmoore Ct., Clarkston, MI (US) 48348

(*) Notice: Subject to any disclaimer, the term of this patent is extended or adjusted under 35 U.S.C. 154(b) by 0 days.

(21) Appl. No.: 09/258,622

(22) Filed: Feb. 26, 1999

Related U.S. Application Data

(60) Provisional application No. 60/076,307, filed on Feb. 27, 1998.

(51) Int. Cl.[7] .................................................. B60C 23/00
(52) U.S. Cl. ........................ 340/447; 340/442; 73/146.5
(58) Field of Search ..................................... 340/442, 445, 340/447, 448; 73/146.4, 146.5, 146.8; 200/61.22, 61.25; 152/415, 416, 417

(56) References Cited

U.S. PATENT DOCUMENTS

| | | | |
|---|---|---|---|
| 4,640,331 | 2/1987 | Braun et al. | 152/417 |
| 4,678,017 | 7/1987 | Schultz | 152/416 |
| 4,754,792 | 7/1988 | Braun et al. | 152/417 |
| 4,782,879 | 11/1988 | Le Chatelier et al. | 152/417 |
| 4,804,027 | 2/1989 | Runels | 152/417 |
| 4,883,106 | 11/1989 | Schultz et al. | 152/417 |
| 4,898,216 | 2/1990 | Schultz et al. | 141/4 |
| 4,922,946 | 5/1990 | Boulicault | 137/102 |
| 4,924,926 | 5/1990 | Schultz et al. | 152/417 |
| 5,174,839 | 12/1992 | Schultz et al. | 152/415 |
| 5,180,456 | 1/1993 | Schultz et al. | 152/416 |
| 5,231,872 * | 8/1993 | Bowler et al. | 340/445 |
| 5,253,687 | 10/1993 | Beverly et al. | 152/416 |
| 5,313,995 | 5/1994 | Schultz | 152/416 |
| 5,505,080 * | 4/1996 | McGhee | 340/447 |
| 5,516,379 | 5/1996 | Schultz | 152/415 |
| 5,600,301 | 2/1997 | Robinson, III | 340/442 |
| 5,611,875 * | 3/1997 | Bachhuber | 152/415 |
| 5,629,873 * | 5/1997 | Mittal et al. | 702/140 |
| 5,838,229 * | 11/1998 | Robinson, III | 340/442 |

FOREIGN PATENT DOCUMENTS

| | | |
|---|---|---|
| 0297837 | 10/1991 | (EP). |
| 0352921 | 11/1993 | (EP). |

* cited by examiner

*Primary Examiner*—Van T. Trieu
(74) *Attorney, Agent, or Firm*—Liniak, Berenato, Longacre & White

(57) ABSTRACT

A method of establishing a target pressure for a vehicle tire for storage in a receiver having a microcontroller where a sensor/transmitter combination is mounted on each wheel. After each tire is inflated to the target pressure the sensor/transmitters are sequentially triggered to send an identification code and a target pressure signal to the receiver for storage in memory. In an alternate embodiment, the target tire pressures are statistically averaged and a warning signal is generated if a single tire target pressure deviates a predetermined amount from the statistical average.

5 Claims, 4 Drawing Sheets

TARGET PRESSURE LEARN STRATEGY FOR VEHICULAR TIRE PRESSURE SYSTEMS

RELATED APPLICATIONS

This application claims the benefit of U.S. Provisional Application No. 60/076,307, filed Feb. 27, 1998.

BACKGROUND OF THE INVENTION

The present invention relates to a system for monitoring the pressure of tires in a vehicle. In particular, the invention relates to a tire pressure monitoring system employing pressure sensors/transmitters located in each tire that transmit information to a receiver/controller.

Prior art vehicular systems exist which use pressure sensors/transmitters located in each tire that transmit pressure information to a receiver. Each sensor/transmitter may have an identification code associated therewith which enables the receiver to know which sensor/transmitter the pressure information is received from. The receiver analyzes the pressure information and, in some systems, displays current pressure information to the vehicle's operator via a mounted display. Some systems also contemplate the provision of a warning signal to the operator in the situation where the tire pressure is determined to be low. Such a prior art system is described in U.S. Pat. No. 5,600,301, the disclosure of which is incorporated herein by reference.

U.S. Pat. No. 5,600,301 provides a "learning" method whereby the receiver can learn the identification code associated with each tire sensor/transmitter, as well as the initial tire location associated with each sensor/transmitter. Furthermore, the method enables recalibration to be achieved whereby upon command from the operator, the receiver learns the new tire positions of the sensor/transmitters caused by rotation of the tires for maintenance purposes when the operator signals a learn mode at the drivers console and each tire transmitter is signaled to transmit a ID code in a specific order of wheel location on the vehicle.

However, prior art systems have not addressed the problem of enabling such systems to easily accommodate different "target" pressures of the tires. These target or desired pressures are used for operations such as determining whether or not improper inflation pressures are present and, thus, if a warning signal to the operator should be provided. Such target or desired pressures may vary for a variety of reasons, including different operating characteristics from one vehicle to the next, or may vary in the same vehicle based on the operating terrain or speed of the vehicle. Unfortunately, accommodation of different target pressures in the prior art systems disadvantageously requires the use of discrete pressure-specific part numbers which adds to the complexity of the production, distribution, and servicing of such systems.

Therefore, a methodology is needed whereby the receiver/system can easily learn the target pressure of each tire.

BRIEF SUMMARY OF THE INVENTION

The present invention provides a method of easily identifying a target pressure signal level for each tire on a vehicle such as a tractor and trailer. Using the present invention, a plurality of individual tires are first inflated or deflated so that a desired target pressure level is achieved in each tire. Then each tire pressure signal transmitter is switched into a "program" or "learn mode" sequentially in order of location on the tractor/trailer by a receiver which is switched into the program mode whereupon a tire identification code is transmitted to the receiver along with a signal indicative of the target tire pressure level. Each target pressure level is stored in the receiver along with the identification code and location on the tractor/trailer for later reference in controlling the inflation pressure of each tire. In an alternate embodiment, if any individual tire pressure deviates significantly from an average target pressure, then the operator can be alerted of the abnormality and the pressure in that tire can be readjusted for reprogramming by the receiver.

One provision of the present invention is to provide a method of identifying a target pressure signal for each vehicle tire.

Another provision of the present invention is to provide a method of identifying an identification code and a target pressure signal for each vehicle tire.

Another provision of the present invention is to provide a method of identifying a target pressure signal for each vehicle tire and determining if an abnormal pressure signal condition exists.

Still another provision of the present invention is to provide a method of identifying a target pressure signal for each vehicle tire and determining if an abnormal target pressure signal condition exists based on a statistical analysis of the target pressure signals.

DETAILED DESCRIPTION OF THE INVENTION

Figure 1:
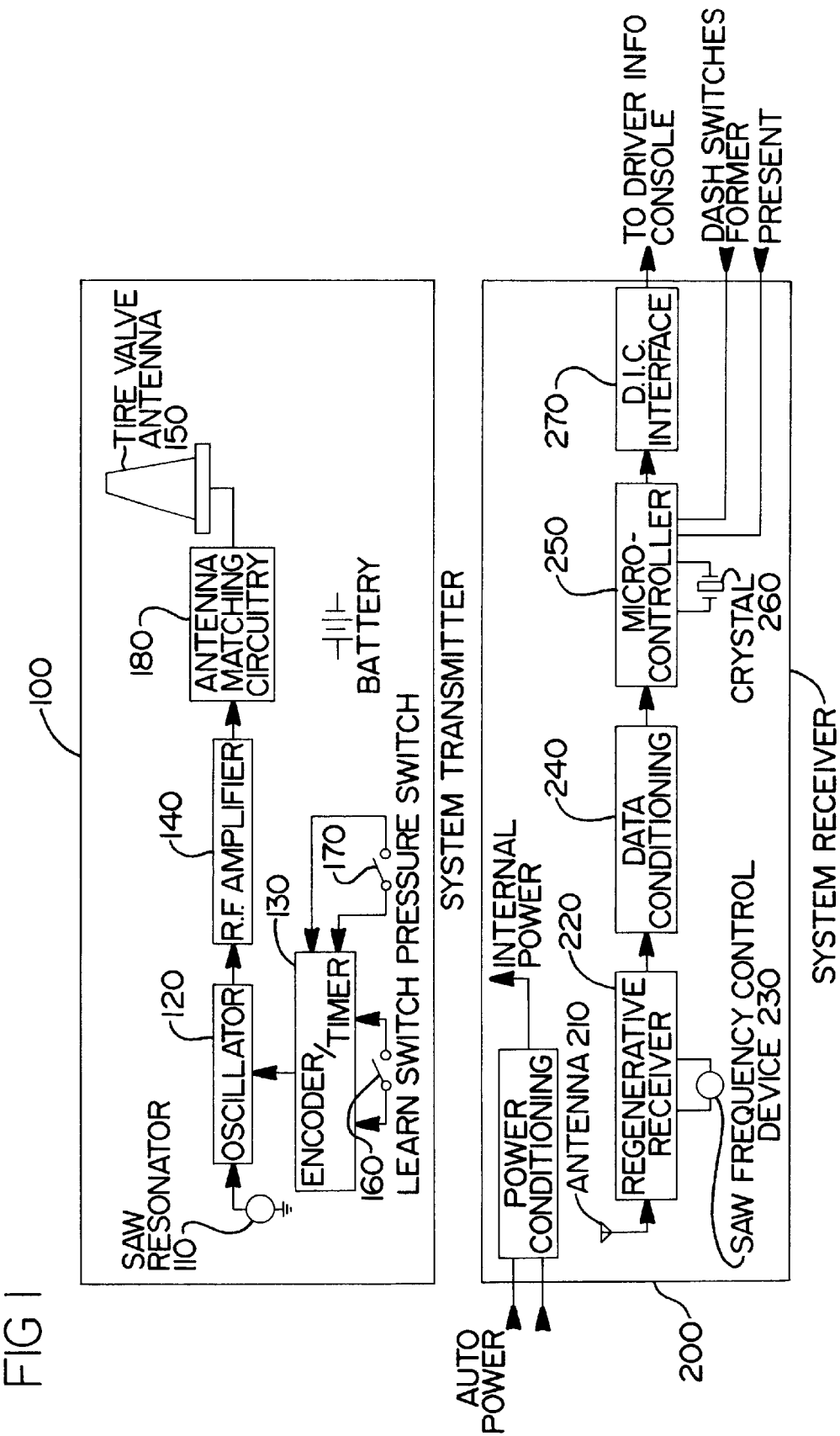
FIG. 1 is a block diagram of transmitting and receiving apparatus of a system embodying the present invention.

Referring now to the drawings, which are not intended to limit the invention, FIG. 1 is a block diagram of a tire pressure monitoring system embodying the present invention. FIG. 1 shows a sensor/transmitter 100, one of which is provided for each tire in a vehicle, and a system receiver 200 including a receiver antenna 210 where tire valve stems can be used as an antenna or a separate antenna can be used/placed inside of the wheel and a microcontroller 250. The structure, details and operation of such a system are provided in U.S. Pat. No. 5,600,301, the disclosure of which is incorporated herein by reference. It is to be understood that the present invention is not limited to use with any one particular tire pressure monitoring system or with any particular structure of sensor/transmitter 100 or system receiver 200.

Figure 2:
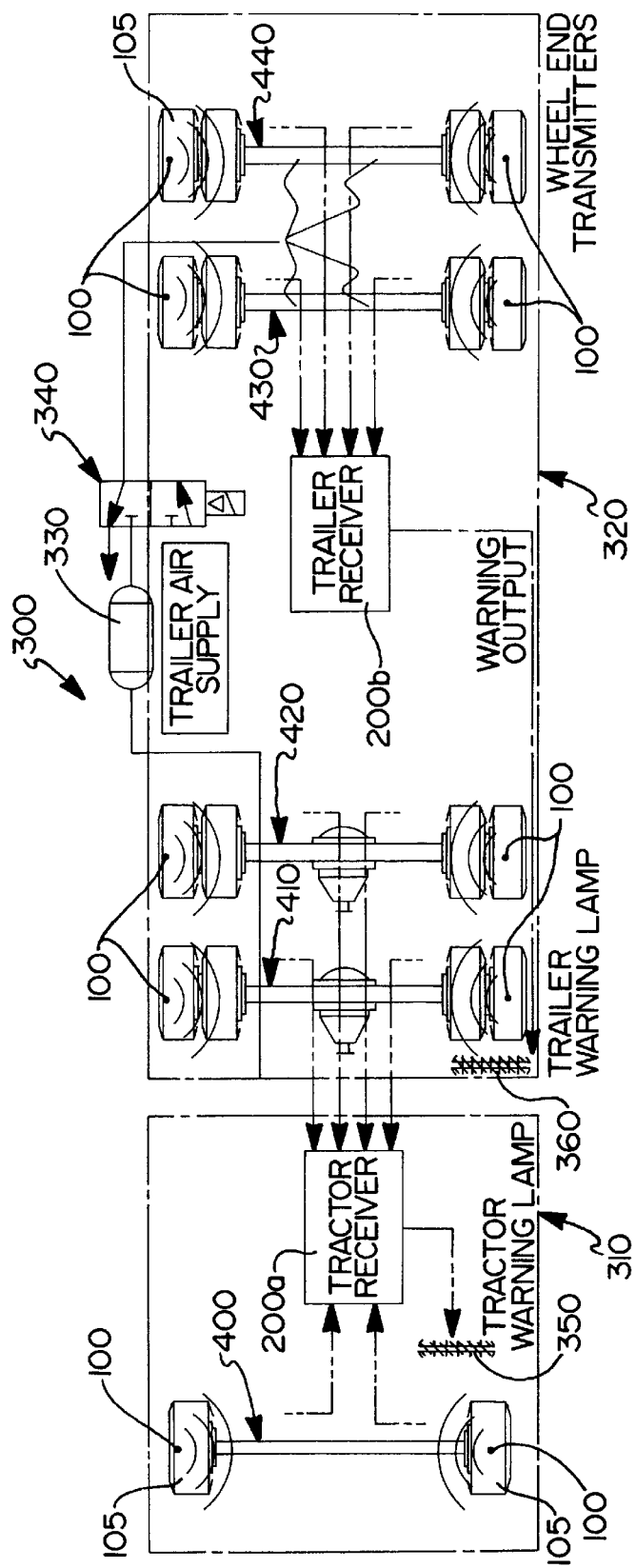
FIG. 2 is a shows a vehicle embodying the apparatus of FIG. 1.

The tire pressure monitoring system embodying the present invention can be used in any type of vehicle, including but not limited to automobiles, trucks, tractors and trailers and various combinations thereof. In the smaller vehicle environment, one system receiver 200 with one receiver antenna 210 should be sufficient to receive information from sensor/transmitters 100. However, in the larger vehicle environment, particularly the tractor-trailer environment, more than one system receiver 200 may be desirable, as shown in FIG. 2 as tractor receiver 200a and trailer receiver 200b. FIG. 2 shows a tractor-trailer 300, with one system tractor receiver 200*a* for the tractor and one system trailer receiver 200*b* for the trailer. Such a set-up is beneficial in view of the fact that a particular tractor is rarely permanently matched with a particular trailer, and enables the tire pressure monitoring system for each to be independently operational. Each sensor/transmitter 100 is mounted to the back of a conventional screw-in tire valve. As will be described, the valve acts as an antenna to transmit coded tire identification and pressure information to the receiver 200.

Referring once again to FIG. 1, a surface acoustic wave (SAW) device 110 functions as the primary oscillator in each sensor/transmitter 100, to provide an amplitude-modulated RF carrier signal. An application specific integrated circuit (ASIC) 130 is configured to set the output data rate of the coding circuitry of the device. The RF signal output, with the ASIC-supplied code superimposed thereon, is amplified and buffered in a following amplifier stage 140 which may be a simple, efficient, low-cost common emitter amplifier which can produce an RF signal having an amplitude appropriate for supplying effective communication to a receiver operating within the vehicle's passenger compartment. The data signal from the transmitter's encoder ASIC keys this amplifier stage on and off. The result is a pulse width modulated signal which conveys digital information, superimposed on the amplitude-modulated RF carrier.

The output of amplifier 140 is matched correctly onto a valve stem 150 of the tire. The valve stem 150 is a particularly appropriate antenna, because it is exposed through the vehicle wheel, and hence makes an ideal radio signal radiator. The antenna matching circuitry 180 provides for maximum RF power transfer. It can be appreciated that using an antenna which is contained completely within the tire would reduce the amount of energy at the receiver, thus necessitating either a more powerful transmitter, or a more sensitive receiver. In view of the transmitter's operating frequency, the valve stem is short. Hence, appropriate impedance matching circuitry 180 is provided to ensure that all of the radio frequency is conducted to the antenna. Also, to isolate the valve stem from water and dirt and also to insulate it from the conductive wheel in which it is mounted, a special non-conductive coating is applied to the exterior of the valve.

Looking now at receiver 200 in FIG. 1, it is noted first that the function of this receiver is to accept information from each wheel in the device (i.e. from each of sensor/transmitters 100), decode that information, and send it to the driver's information console for display to the vehicle operator. Each receiver 200 is a very low power, regenerative type receiver which operates at the frequency of its associated sensor/transmitters 100. The receiver 200 is designed to be compatible with other radio frequency receivers operating within the same vehicle. Such receivers include, for example, that associated with a keyless entry system with which the vehicle may be equipped.

The receiver 200 incorporates a regenerative design because such a design is low in cost, is efficient, and exhibits a high sensitivity. As in the sensor/transmitter 100, the receiver 200 uses SAW-based frequency control, thus stabilizing the operating frequency effectively in view of both temperature and mechanical vibration. The SAW-based design also is advantageous because it enables tight containment of the characteristic spectral noise, inherently created by a regenerative receiver, around the desired operating frequency. The tight containment around the operating frequency enhances the compatibility of the receiver with other receivers within the vehicle. This SAW-based receiver design approach also exhibits good selectivity.

As shown in FIG. 1, an antenna 210 receives signals from the valve stem antenna 150. The antenna 210, which is mounted within an enclosure of the receiver 200, is sensitive in both vertical and horizontal polarization modes in order to decrease the effects of polarization mismatch between system transmitters and receivers.

The received signal is provided to regenerative receiver 220, which as described above operates in conjunction with a SAW frequency control device 230. A data conditioning section 240 is provided at the output of receiver 220, to reduce signal degradation which can be caused by external noise. The output of data conditioning section 240 is provided to a microcontroller 250, which in the preferred embodiment is an eight-bit microcontroller, through the use of other more powerful microcontrollers is contemplated as processors become more powerful and less expensive.

The mircocontroller 250, which receives timing signals from crystal 260, decodes the information in the signal and transmits it to a bus interface 270 which interprets the decoded information in accordance with the particular driver information console (not shown) in the vehicle. Different vehicle manufacturers may use different proprietary designs for their consoles, so the bus interface likewise would be proprietary to the manufacturer. As the interface is a separately-available component, it need not be described in detail here. Normally, however, the interface will be comprised of an integrated circuit and perhaps four or five external passive, low-cost components.

The receiver 200 also includes a wheel-rotation recalibration switch interface, associated with mircocontroller 250. As has been mentioned, recalibration of the system is necessary in order to update the system to learn any new wheel locations resulting from rotation of the tires. In fact, the same structure may be used to allow the system to learn the initial wheel location (e.g. left front and rear, right front and rear, for a four-wheeled vehicle) at the time of manufacture.

Also shown at the upper left hand corner of receiver 200 in FIG. 1 is power conditioning circuitry 280, which includes a voltage regulator for reducing and adjusting the standard voltage (e.g. 13.8 volts) provided by a vehicle electrical system to a stable 5.0 volts used by the circuitry in the radio frequency, mircocontroller, and driver information console interface circuitry.

As previously mentioned, the prior art has provided "learning" methods whereby a system receiver 200 can learn the identification code associated with each tire sensor/transmitter 100. Such a method is set forth in detail in U.S. Pat. No. 5,600,301. Briefly, the method disclosed in that patent first involves the simultaneous depression of two buttons connected to system receiver 200 that places the system in a "program" or "learn" mode. While in that mode, receiver 200 is sensitive to receipt of a distinctive learn mode signal from a sensor/transmitter 100. In order to cause a particular sensor/transmitter 100 to send a learn mode signal, a strong electromagnet (not shown) one for each wheel/tire assembly is individually turned on and a magnetic field is swept over the outside of the vehicle tire near the sensor/transmitter 100 which signals the sensor/transmitter 100 to send an identification code which is unique to a particular tire. The learn mode signal transmitted by a particular sensor/transmitter 100 is received by system receiver 200 which has been sensitized to learn its new family of transmitter identification codes. The sequence in which the sensor/transmitters 100 are switched into the learn mode teach receiver 200 (i.e., the order in which the magnet is passed by each of the vehicle tires) determines the current location of each tire on the vehicle, e.g., left front, left rear, right front, right rear, etc. This process enables easy start-up position calibration of system receiver 200.

The present invention contemplates the modification of such a methodology in order to provide a more comprehensive "learning" or "program" mode in order to enable the tire pressure monitoring system to learn the target pressure of each tire in addition to the identification code corresponding to the sensor/transmitter 100 of that tire.

The method pursuant to the present invention first involves the step of manually setting all tires on the vehicle to the desired target pressure. Preferably, a highly accurate pressure gauge is used to complete this task. Next, system receiver 200 is manually placed in a "program" mode whereby it is sensitive to the receipt of learning signals from sensor/transmitters 100. In order to accomplish this, buttons may be provided that are connected to system receiver 200, although many other methods may be employed, as is known to one of ordinary skill in the art. Next, each sensor/transmitter 100 is manually triggered, in a sequential manner, to transmit its identification code and present tire pressure (target pressure) information in the form of a signal to system receiver 200. Although this triggering may involve the sweeping of a magnet near each sensor/transmitter 100, other triggering methods may be employed, as is known to those skilled in the art, such as the use of an excitation coil. When triggering occurs, system receiver 200, in its "program" mode, stores the identification code and target pressure information that is sequentially received. Lastly, system receiver 200 is caused to exit the "program" mode. Although this may be accomplished manually, the exiting may be accomplished automatically via appropriate programming in microcontroller 250, such as when all memory registers are filled or if a predetermined time period times out.

Once the above sequence of steps is completed, the system embodying the present invention can proceed with its normal operations, which preferably includes comparing subsequently-received pressure information from each tire to the stored target pressure for that tire. A warning signal can be provided to the operator of the vehicle such as that provided by a tractor warning lamp 350 or a trailer warning lamp 360 (see FIG. 2) if the current tire pressure varies from the target pressure or is outside a statistical range based on an average of the target pressures. Furthermore, it is contemplated that the present invention may be used in a tire pressure management system to enable tire pressures to be maintained at desired levels via the application of pressurized air. On such system is disclosed in U.S. Pat. No. 5,313,995, the disclosure of which is incorporated herein by reference, which could be modified to work in conjunction with sensor/transmitters 100.

Now referring to FIG. 2, a schematic showing a vehicle employing the apparatus of FIG. 1 is shown. Generally shown is the outline of a tractor 310 connected to a trailer 320 forming a traditional tractor/trailer vehicle 300. The tractor 310 contains a sensor/transmitter 100 mounted on the wheels 105 of a steer axle 400 which transmit signals representing the tire identification number and a tire pressure to the tractor receiver 200a. In a like manner, the wheels mounted on the drive axles 410 and 420 are each fitted with sensor/transmitters 100 which also transmit tire information to the tractor receiver 200a. The trailer 320 includes a pair of trailer axles 430, 440 which have tires 105 each fitted with respective sensor/transmitters 100 which transmit signals representing the tire identification number and a tire pressure to the trailer receiver 200b.

Both the tractor receiver 200a and the trailer receiver 200b can be put in a learn or program mode where signals are received from the sensor/transmitters 100 at each tire in a specific order by location on the tractor-trailer 300 representing the tire identification code and a target tire pressure.

In normal operation the sensor/transmitters 100 periodically send tire identification and pressure information to the receivers 200a, 200b. If a tire pressure varies sufficiently from the earlier established target pressure then a warning light can be illuminated such as the tractor warning lamp 350 or the trailer warning lamp 360. In some systems, the trailer air supply 330 can be used to increase the pressure in any tire 105 located on the trailer 320 through air valves 340 with similar capability to increase the pressure of the tires 105 located on the tractor 310. It should be noted that a variety of vehicle configurations can be fitted with the tire pressure monitoring/maintenance system of the present invention.

Figure 3:
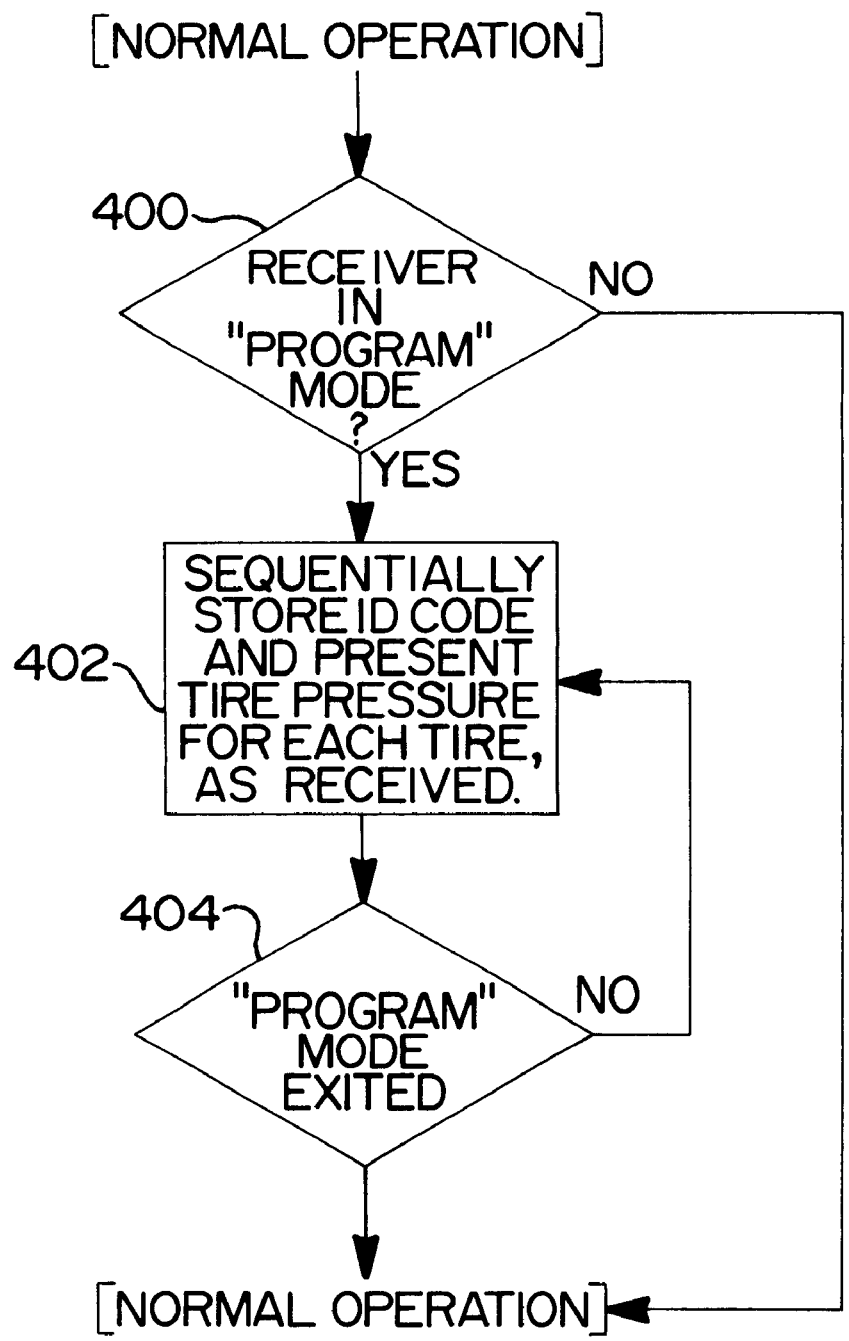
FIG. 3 is a flowchart of the programming of the present invention.

FIG. 3 shows a flowchart of the programming of mircocontroller 250 (see FIG. 1) of the present invention. Programming blocks 400, 402 and 404 are the programming blocks that would be used in the system description above. As shown, block 400 is entered during normal operation of the tire pressure monitoring system, making the programming applicable to a reprogramming or recalibration of the system sometime after initialization. However, the flowchart of FIG. 3 can be modified, as is known to one of ordinary skill in the art, to be applicable to the initial installation/operation of the system when no identification codes or target pressures have been stored.

Pursuant to FIG. 3, microcontroller 250 determines, in block 400, whether or not it is in the program (or learn) mode. If not, the programming continues with the normal operation of the system. If microcontroller 250 determines that it is in the program mode, then block 402 causes system receiver 200 (tractor receiver 200a and/or trailer receiver 200b) to store the identification code and present tire pressure (target pressure) information for each tire 105 as it is sequentially received according to the location on the vehicle. Block 404 then determines if the program mode has been exited. If not, the program loops back to block 402. If the program mode has been exited, then block 404 causes microcontroller 250 to return the system to normal operation.

Figure 4:
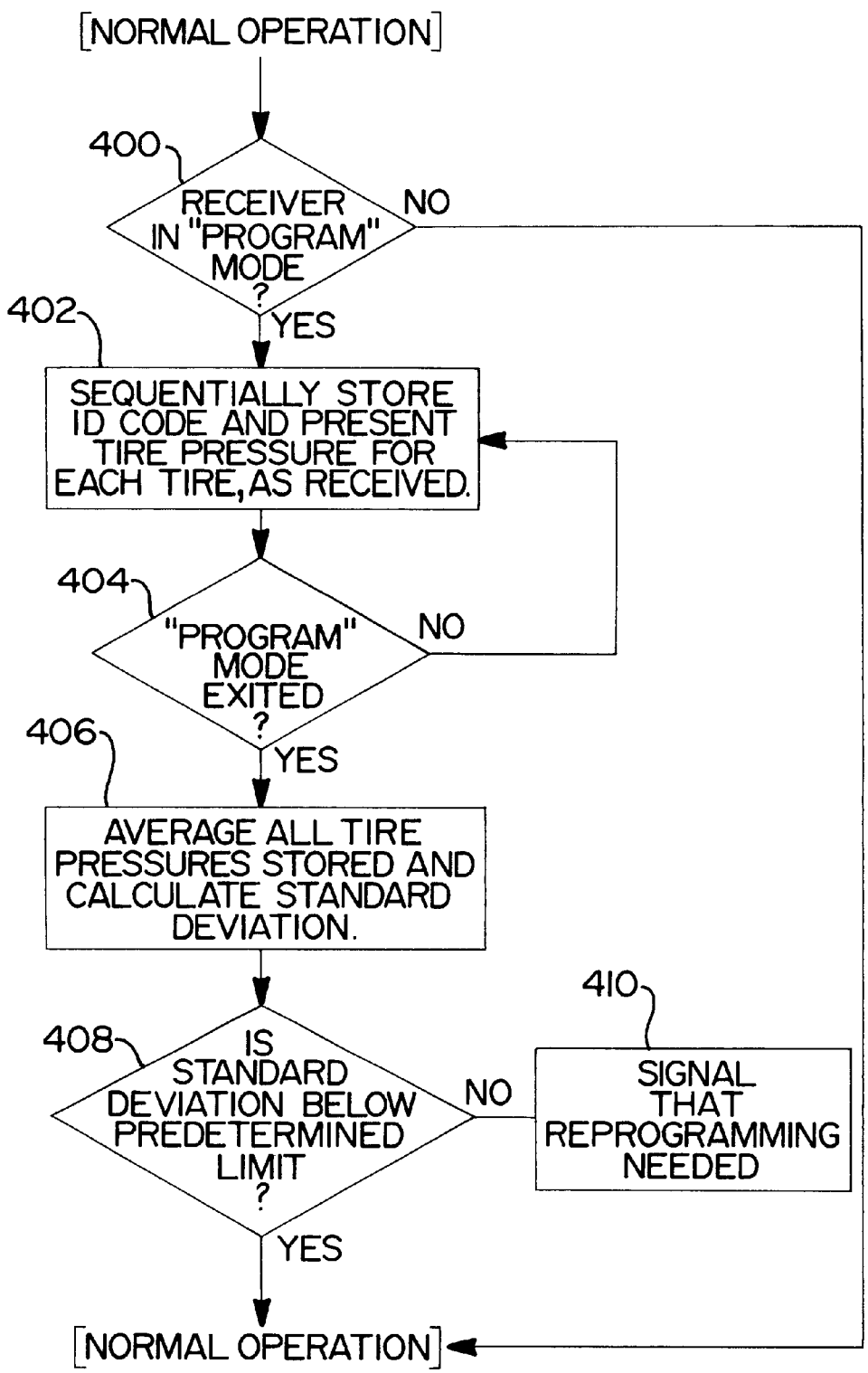
FIG. 4 is a flowchart of the programming of an alternate embodiment of the present invention.

FIG. 4 shows a flowchart of the programming of microcontroller 250 in an alternate embodiment of the present invention. Programming blocks 400, 402 and 404 are the same as the blocks that would be used in the embodiment described above. As shown, block 400 is entered during normal operation of the tire pressure monitoring system, making the programming applicable to a reprogramming or recalibration of the system after operation has been ongoing. However, the flowchart of FIG. 4 can be modified, as is known to one of ordinary skill in the art, to be applicable to the initial installation/operation of the system when no identification codes or target pressures have yet been stored.

Pursuant to FIG. 4, microcontroller 250 determines, in block 400, whether or not it is in the "program" mode. If not, the programming continues with the normal operation of the system. If microcontroller 250 determines that it is in the "program" mode, then block 402 causes system receiver 200 to store the identification code and present tire pressure (target pressure) information for each tire as it is sequentially received. Block 404 then determines if the "program" mode has been exited. If not, the program loops back to block 402. If the "program" mode has been exited, then block 406 causes microcontroller 250 to average all stored tire pressures (target pressures) and to calculate the standard deviation thereof.

Next, block 408 determines if the standard deviation is below a predetermined limit. If not, then block 410 causes a signal to be provided to the vehicle operator in order to indicate that inflation of at least one tire and/or reprogramming of the target pressures is needed. If the standard deviation associated with each tire pressure signal is below the predetermined limit, then normal operation of the system continues wherein the mean (average) pressure is used as the target pressure for all vehicle tires.

It should be noted that the embodiment described above (wherein a target pressure is maintained for each tire which is individually compared to subsequent pressure readings of that tire) is preferred over the programming provided by blocks 406, 408 and 410 when significant sensor variability may exist in sensors/transmitters 100. Such sensor variability may cause the target pressure readings to not precisely reflect the manually preset pressures in the tires, thus potentially causing the standard deviation limit of block 408 to be exceeded when operator error (in filling the tires) is not present. The preferred embodiment accommodates such sensor variability in that the target pressure for each tire is individually stored and monitored.

Again, although reference has been made to the system disclosed in U.S. Pat. No. 5,600,301 for explanatory purposes, it is to be understood that the present invention finds application to any such vehicle tire pressure monitoring system wherein the monitoring and/or maintaining of tire target pressures is desired.

Although the present invention has been described hereinabove with respect to the illustrated embodiments, it will be understood that the invention is capable of modification and variation and is limited only by the scope of the following claims.

We claim:

1. A method for establishing the target pressure of each tire in a receiver memory, in a vehicular tire pressure monitoring system having a plurality of sensor/transmitters for sensing pressure and the receiver operable in a program mode, with one sensor/transmitter associated with each tire of the vehicle and having its own unique identification code, the method comprising the steps of:

setting each tire on the vehicle to a desired target pressure;

causing the receiver to operate in a program mode;

triggering each sensor/transmitter to transmit an identification code and a target pressure signal representing the desired target pressure of the tire associated with that sensor/transmitter;

storing the target pressure signal in the receiver; and causing the receiver to exit its program mode.

2. The method for establishing the target pressure of each tire in a receiver memory of claim 1, wherein each sensor/transmitter is triggered to transmit its identification code and the target pressure signal of the tire associated with that sensor/transmitter in a specific order according to that tire's location on the vehicle.

3. The method for establishing the target pressure of each tire in a receiver memory of claim 1 further comprising the step of comparing at least one of the target pressure signals with an average of all target pressure signals and generating a warning signal if any of the at least one of the target pressure signals differs from the average of all target pressure signals by a predetermined amount.

4. A method to establish one or more target tire pressure signals for storage in a receiver in a vehicle tire pressure monitoring system having a sensor/transmitter located in each tire comprising the steps of:

setting a tire pressure in each tire to a desired target pressure;

causing the receiver to operate in a program mode;

triggering each sensor/transmitter in a specific order according to a tire's location on the vehicle to transmit an identification code and a pressure signal representing the desired target pressure of the tire;

receiving, processing and storing the pressure signal in the receiver; and causing the receiver to exit the program mode.

5. The method to establish one or more target tire pressure signals of claim 4 having a plurality of tires and a plurality of pressure signals representing the desired target pressure of each of the plurality of tires, the method further comprising the steps of:

calculating an average target pressure value of all the pressure signals;

comparing the pressure signals from each tire with the average target pressure value; and displaying a warning signal if one or more of the pressure signals differs from the average target pressure value by at least a predetermined amount.

* * * * *